United States Patent
Hsiao et al.

[11] Patent Number: 6,162,305
[45] Date of Patent: Dec. 19, 2000

[54] METHOD OF MAKING SPIN VALVE READ HEAD WITH PLASMA PRODUCED METAL OXIDE INSULATION LAYER BETWEEN LEAD AND SHIELD LAYERS

[75] Inventors: Richard Hsiao; Daniele Mauri, both of San Jose; Neil Leslie Robertson, Palo Alto, all of Calif.

[73] Assignee: International Business Machines Corporation, Armonk, N.Y.

[21] Appl. No.: 09/344,253

[22] Filed: Jun. 25, 1999

Related U.S. Application Data

[62] Division of application No. 08/989,105, Dec. 11, 1997, Pat. No. 5,999,379.

[51] Int. Cl.[7] ........................................... C23C 8/04
[52] U.S. Cl. .............. 148/280; 148/284; 148/DIG. 117; 29/603.07
[58] Field of Search ..................... 148/241, 276, 148/277, 280, 284, DIG. 163, DIG. 118, DIG. 117; 29/603.07; 360/113, 120

[56] References Cited

U.S. PATENT DOCUMENTS

| | | | |
|---|---|---|---|
| 4,675,980 | 6/1987 | Lade et al. | 29/571 |
| 5,302,461 | 4/1994 | Anthony | 428/471 |
| 5,337,203 | 8/1994 | Kitada et al. | 360/113 |
| 5,408,377 | 4/1995 | Gurney et al. | 360/113 |
| 5,475,551 | 12/1995 | Honda et al. | 360/120 |
| 5,555,147 | 9/1996 | Maruyama | 360/113 |
| 5,617,277 | 4/1997 | Chen et al. | 360/113 |
| 5,809,636 | 9/1998 | Shouji et al. | 360/113 |

FOREIGN PATENT DOCUMENTS

| | | |
|---|---|---|
| 58-016580 | 1/1983 | Japan . |
| 6-044535 | 2/1994 | Japan . |
| 8077514 | 3/1996 | Japan . |

*Primary Examiner*—George Wyszomierski
*Assistant Examiner*—Andrew L. Oltmans
*Attorney, Agent, or Firm*—Gray Cary Ware & Freidenrich LLP; Ervin F. Johnston

[57] ABSTRACT

A method is provided for providing extra insulation between lead layers and first and second shield layers of a read head so as to prevent electrical shorting therebetween. A sensor layer is partially formed with a capping layer of a first oxidizable metallic layer. A lead layer is formed with a second oxidizable metallic capping layer thereon. A rear edge of the partially completed sensor is then formed followed by formation of an insulation layer which seals the rear edge. The wafer, upon which the components are constructed, is then subjected to an oxygen-based plasma which oxidizes the oxidizable layers with the second oxidizable metallic layers oxidizing at a faster rate than the first oxidizable metallic layer. The second oxidized layer then provides the desired extra insulation between the lead layers and the second shield layer. The read head produced by the method includes a sensor layer and first and second lead layers. A first metal oxide layer is on the sensor layer and a sensor layer and a second metal oxide layer is on each of the first and second lead layers. The sensor layer, the first and second lead layers and the first and second metal oxide layers are located between first and second gap layers and the first and second gap layers are located between first and second shield layers.

34 Claims, 18 Drawing Sheets

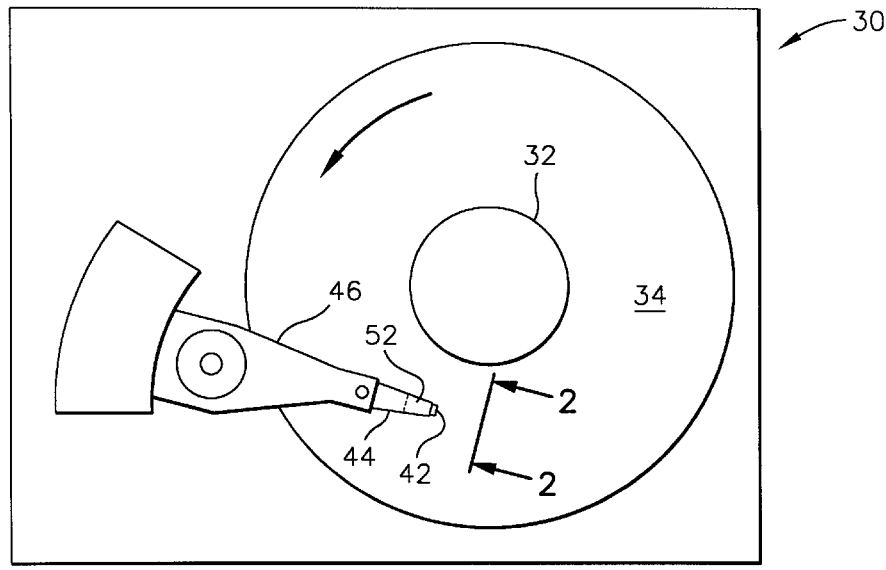
FIG. 1
FIG. 2
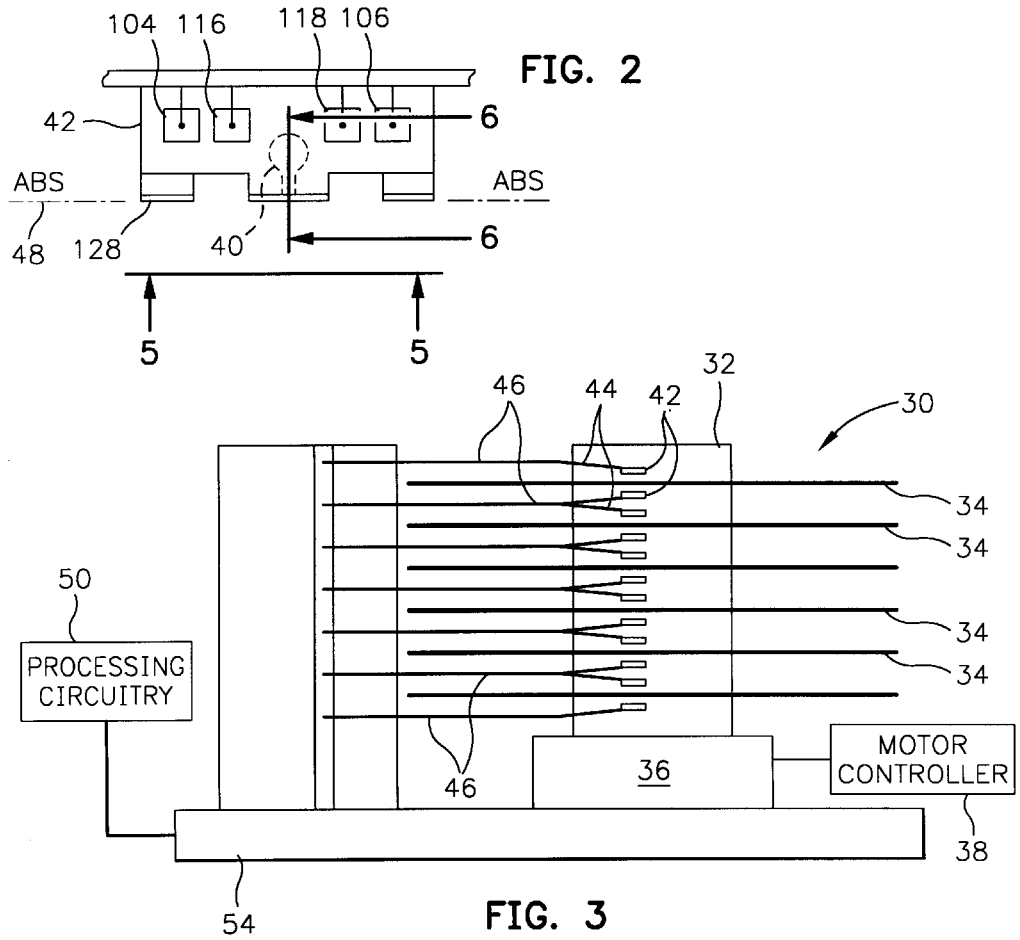
FIG. 3

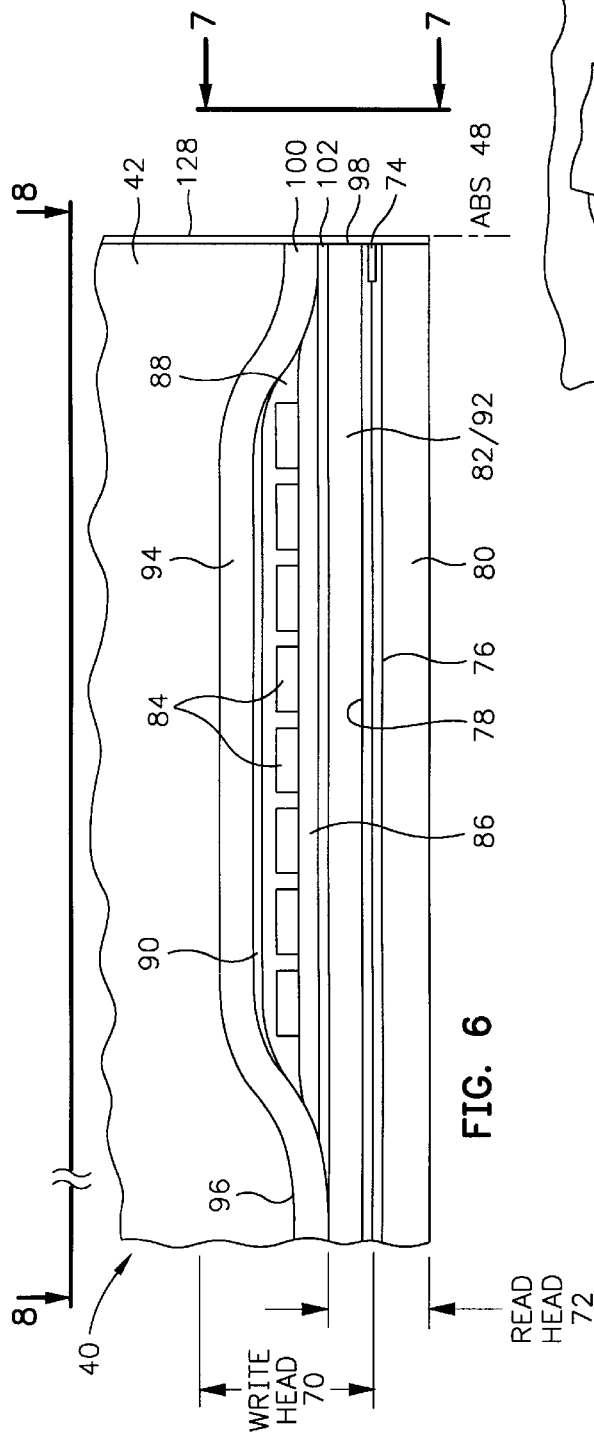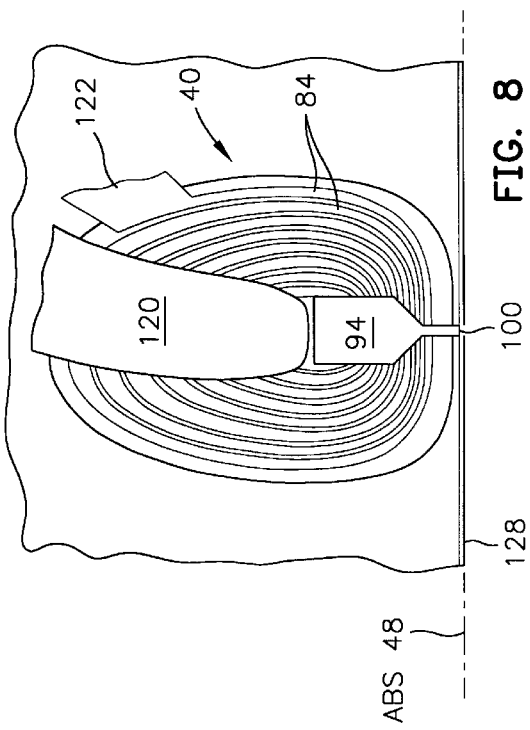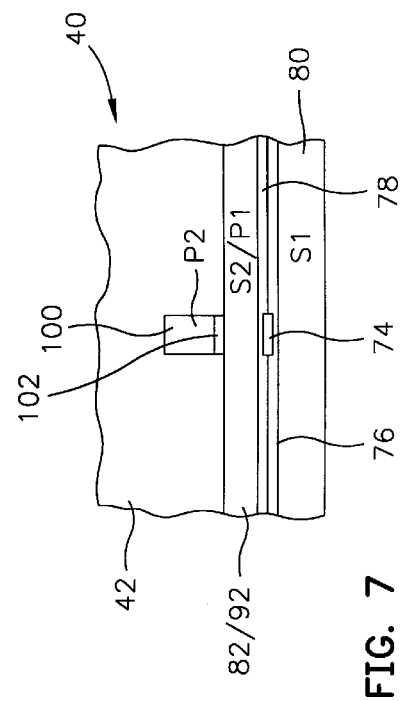
FIG. 6
FIG. 7
FIG. 8

METHOD OF MAKING SPIN VALVE READ HEAD WITH PLASMA PRODUCED METAL OXIDE INSULATION LAYER BETWEEN LEAD AND SHIELD LAYERS

CROSS REFERENCE TO RELATED APPLICATION

This application is a divisional application of application Ser. No. 08/989,105 filed Dec. 11, 1997 now U.S. Pat. No. 5,999,379.

BACKGROUND OF THE INVENTION

1. Field of the Invention

The present invention relates to a spin valve read head with plasma produced metal oxide insulation layer between lead and shield layers and, more particularly to a read head that caps first and second lead layers with a metallic oxide layer that, in combination with a gap layer, provides electrical insulation between the lead layers and a shield layer so as to prevent electrical shorts therebetween, and a method of making the read head.

2. Description of Related Art

A read head includes a sensor that is located between first and second nonmagnetic gap layers which, in turn, are located between first and second shield layers. The resistance of the sensor changes in response to magnetic fields in the tracks of a rotating disk. A sense current conducted through the sensor results in voltage changes that are detected by processing circuitry as readback signals. The sensor may be a spin valve sensor or an anisotropic magnetoresistive (AMR) sensor. A spin valve sensor, which is preferred, includes a spacer layer that is located between a pinned layer and a free layer, and an antiferromagnetic layer that pins the magnetic moment of the pinned layer. An AMR sensor includes a ferromagnetic stripe. First and second lead layers are connected to side edges of either sensor for conducting a sense current therethrough.

Each of the lead layers has an end edge that abuts a respective side edge of the sensor to form what is known in the art as a contiguous junction. The distance between the contiguous junctions defines the track width of the read head. A hard magnetic layer typically underlies each lead layer and also has an end edge that abuts a respective side edge of the sensor. The hard magnetic layer, known in the art as a hard bias layer, longitudinally biases the sensor to stabilize its magnetic domains so as to prevent Barkhausen noise. Alternatively, each lead layer may overlap a portion of the sensor to form what is known in the art as a continuous junction. The track width of a continuous junction read head is defined by the distance between the overlapping portions. The contiguous junction configuration is preferred to the continuous junction configuration because one masking step can be employed for defining the track width of the sensor as well as depositing the leads to make the contiguous junctions.

The areal or bit density of a read head is determined by its track width and read gap. Track width defines the number of tracks read per inch (track density), while read gap defines the number of bits read per inch of track (linear density). From these parameters, the bits read per square inch of recording surface can be determined. With regard to read head construction, track density is easier to increase than linear density. In order to maximize linear density, the first and second gap layers at the top and the bottom of the sensor must be extremely thin. For instance, for a 10 Gb/in$^2$ read head, the total read gap should be about 150 nm. With a sensor thickness of about 35 nm, this leaves about 115 nm to be allocated between the first and second gap layers. However, a gap layer of 57 to 58 nm may not be sufficiently thick to protect a lead layer from electrical shorts. Because of the large area of the lead layers, there is a high risk that the adjacent gap layers will have pinholes that permit shorting. This has a serious impact on manufacturing yield.

One way to minimize the risk of pinhole shorts is to deposit additional insulation material outside the sensor frame. This can be accomplished by depositing a layer of insulation immediately on top of the first gap layer outside the sensor frame, and then depositing another layer of insulation outside the sensor frame just before the second gap layer is formed. This leaves only the first and second gap layers within the sensor frame, but thickens the insulation depth outside the sensor frame where the lead layers extend to the terminals. Unfortunately, a portion of each lead layer between a contiguous junction and the additional insulation layers is protected only by the first and second gap layers, which leaves that portion at risk of shorting to a shield layer. Another problem, with this arrangement is that the additional insulation layers thermally insulate the sensor, thereby increasing the risk that heating of the sensor will alter its magnetic characteristic. A further drawback is that a masking step is required for each of the two additional insulation layers.

SUMMARY OF THE INVENTION

The present invention provides electrical insulation for the first and second lead layers of a read head by capping the first and second lead layers with a highly oxidized metallic layer that is located between the lead layers and the second gap layer. Accordingly, if the second gap layer has pinholes adjacent the first and second lead layers, the oxidized metallic layer on the lead layers prevents electrical shorts between the lead layers and the second shield layer. In a preferred embodiment, extra insulation is provided adjacent bottom surfaces of portions of the lead layer to prevent pinhole shorting in the first gap layer.

After forming the sensor and the lead layers, a first oxidizable metallic layer is formed on the sensor to protect the sensor from oxidization, and a second oxidizable layer is formed on the lead layers. The first and second oxidizable layers are oxidized by an oxygen-based plasma in a chamber. The materials of the first and second oxidizable metallic layers are chosen so that the second oxidizable layer oxidizes more quickly than the first oxidizable layer. In a specific example we provided a 50 Å thick tantalum (Ta) layer on the sensor and a 500 Å thick zirconium (Zr) layer on the lead layers. After oxidization for 5 minutes in an O$_2$ based plasma, 30 Å of the Ta had been oxidized and 400 Å of the Zr had been oxidized. The oxidized Zr provided excellent extra insulation between the lead layers and the second shield layer.

In a preferred embodiment of the invention, a top edge of the sensor that is located at the stripe height of the sensor is also protected from oxidation during the oxidation step. This is accomplished by forming an insulation layer immediately adjacent the top edge of the sensor. The insulation layer can be formed immediately after forming the stripe height of the sensor. In the preferred embodiment, the insulation layer is also formed in areas where extended lead layers are to be formed. Overlapping, extended lead layers are subsequently formed that are connected to lead layer portions; in turn, the lead layer portions are directly connected to the sensor.

Accordingly, when the extended lead layers are formed, extra insulation is provided between the extended lead layers and the first shield layer. After formation of the extended lead layers, a second oxidizable metallic layer is formed thereon for providing extra insulation between the extended lead layers and the second shield layer.

First steps in the process are to form a first shield layer, a first gap layer, a sensor material layer and the first oxidizable metallic layer on the material layer. A first mask is employed for forming the track width of the sensor, forming first and second leads layers that are connected to side edges of the sensor, and forming the second oxidizable metallic layer on the first and second lead layers. A second mask is employed for forming the top edge (or stripe height) of the sensor that is capped by the first oxidizable layer, and forming the insulation layer immediately adjacent the top edge and in areas where the extended lead layers are to be formed. A third mask is then employed for forming the extended lead layers that overlap and connect to the lead layers and for forming the second oxidizable metallic layer on the extended lead layers.

With this invention, an extra insulation layer formed outside the sensor frame above the lead layers is not required. A separate mask is not needed to form the extra insulation layer. Another advantage of the invention is that the oxidizable metallic layers have better surface coverage of the sensor layer and the lead layers than nonmetallic layers.

An object of the present invention is to provide a method of making a read head wherein lead layers are capped with oxidized metallic layers that insulate the lead layers from electrical shorts to a second shield layer.

Another object is to provide a method of oxidizing metallic layers on a sensor and lead layers of a read head wherein a metallic layer on the lead layers is oxidized more quickly than a metallic layer on the sensor.

A further object is to provide a method of making extra insulation between lead layers and a second shield layer without having to fill space between the lead layers with the extra insulation.

Still another object is to provide a process of making a read head wherein extended lead layer portions are protected by a non-metallic insulation layer from the first shield layer and by an oxidized metallic layer from the second shield layer wherein the non-metallic insulation layer also protects a top edge of the sensor from an oxidization step.

Still a further object of the present invention is to provide a read head wherein lead layers are capped with oxidized metallic layers that insulate the lead layers from electrical shorts to a second shield layer.

Still another object is to provide a sensor and lead layers of a read head wherein the lead layers have an oxidized metallic capping layer that is thicker than an oxidized metallic capping layer on the sensor.

Still a further object is to provide a read head having insulation between lead layers and a second shield layer that is not located in a space between the lead layers.

Still another object is to provide a read head wherein extended lead layer portions are protected by an extra non-metallic insulation layer from the first shield layer and by an oxidized metallic layer from the second shield layer, wherein the extra non-metallic insulation layer also protects a top edge of a sensor.

Other objects and attendant advantages of the invention will be appreciated upon reading the following description taken together with the drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

FIG. 6 is a partial view of the slider and magnetic head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the second pole piece removed;

DESCRIPTION OF THE PREFERRED EMBODIMENTS

Magnetic Disk Drive

Figure 4:
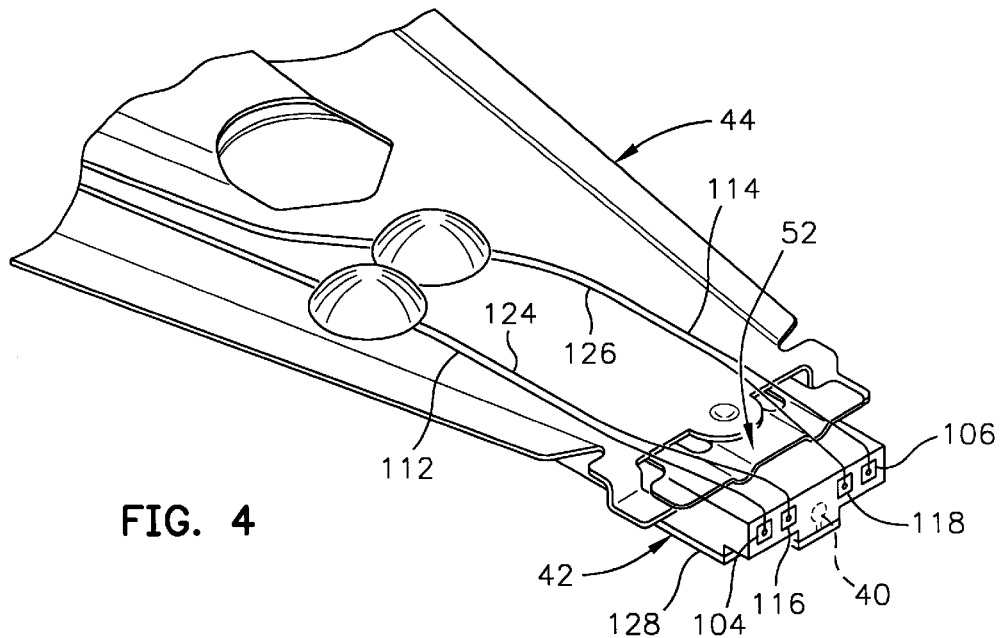
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
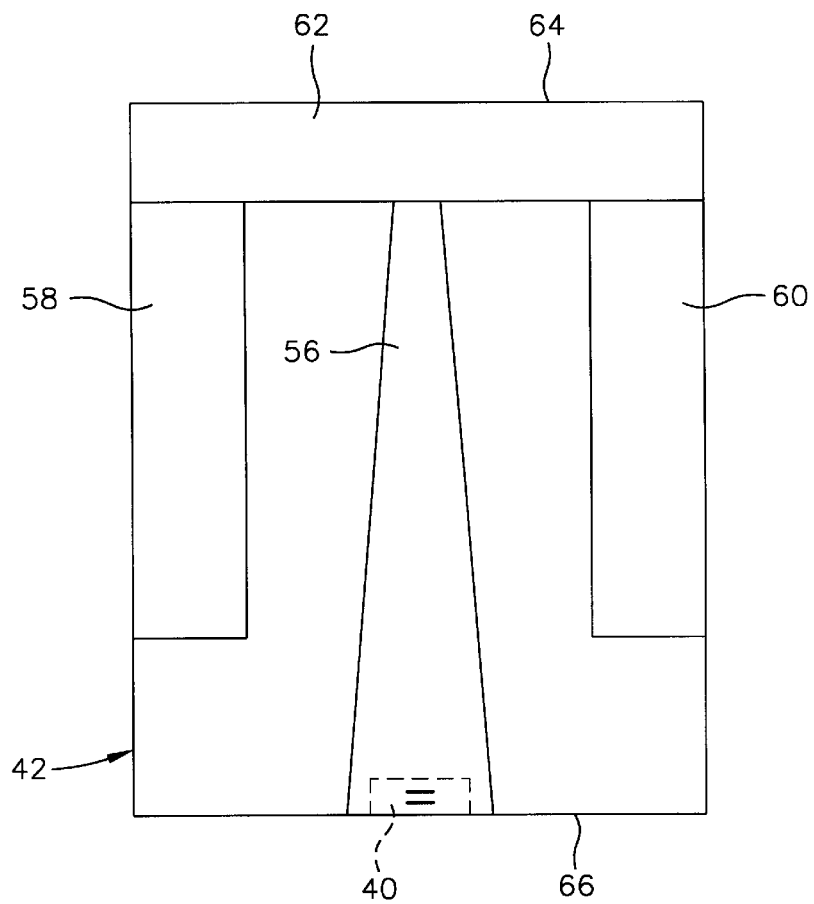
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of the merged spin valve head 40 which has a write head portion 70 and a read head portion 72, the read head portion employing a spin valve sensor 74 of the present invention. Optionally, the sensor may be an AMR sensor. FIG. 7 is an ABS view of FIG. 6. The spin valve sensor 74 is located between first and second gap layers 76 and 78 and the gap layers are located between first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head as shown in FIGS. 2, 4, 6 and 7.

FIGS. 9–37 illustrate how a read head is made according to this invention. In order to better illustrate features of the invention, the thicknesses of some of the layers are not to scale with respect to other layers. The method of this invention employs ion beam deposition or sputter deposition for depositing the metal and insulation layers. Masks are preferably bilayer photoresist layers, in which a bottom photoresist layer is recessed from a top photoresist layer so that a solvent can dissolve the bottom layer, thereby permitting the mask to be lifted from the wafer while carrying with it the material deposited thereon. Stippled layers are insulation layers and heavy lines show the outlines of the masks. The masks are not shown to scale. L(B) represents a bottom lead layer film for first and second lead layers and L(T) represents a second lead layer film for the first and second lead layers. I(B) and I(T) represent bottom and top insulation layer films for each of first and second lead layer sites. Most of the description will be directed toward the first lead layer site which is identical to the second lead layer site.

Figure 9:
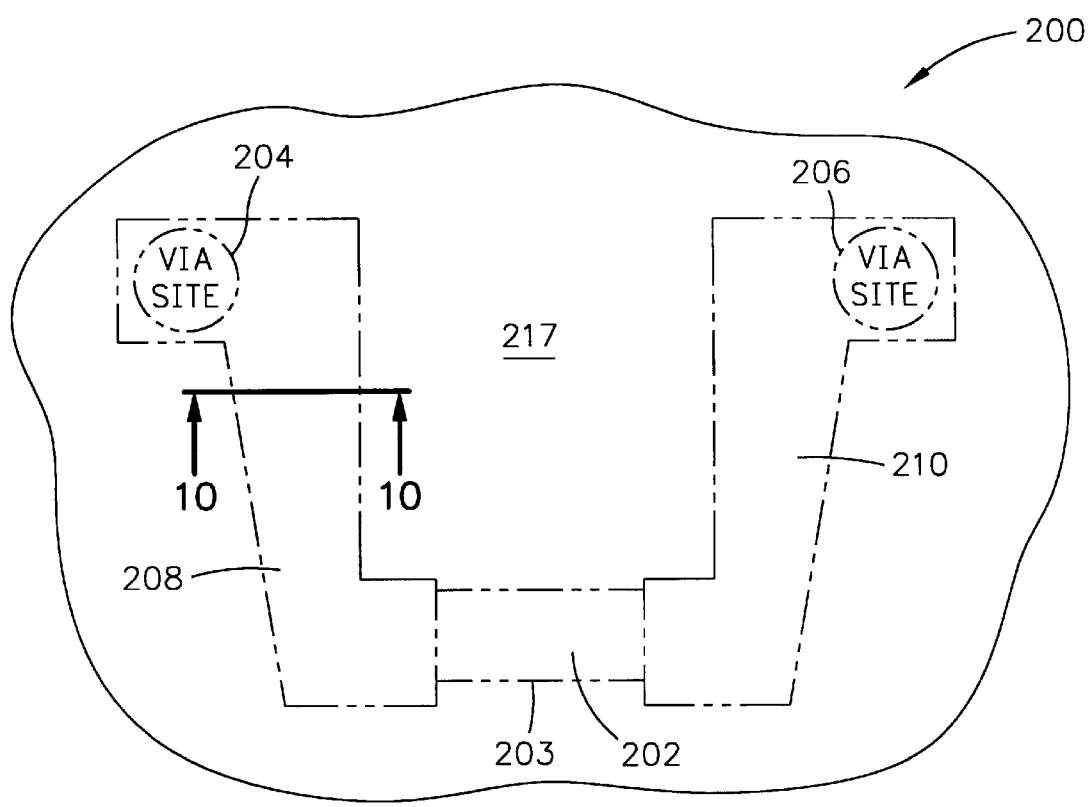
FIG. 9 is a plan view of the first steps of depositing a first shield layer, a first gap layer, a sensor material layer and a first oxidizable layer of the present method.
Figure 10:
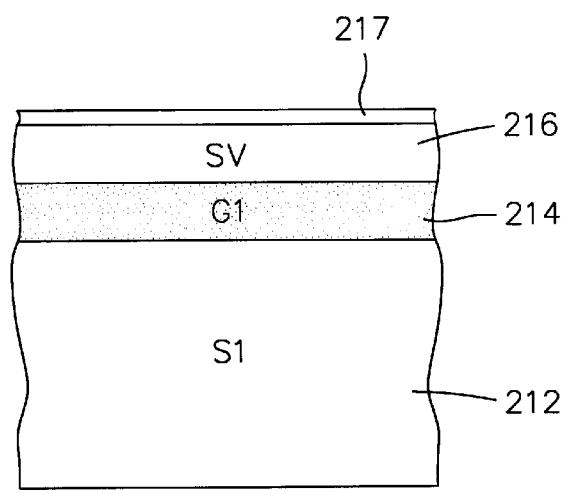
FIG. 10 is a view taken along plane 10—10 of FIG. 9.

FIG. 9 is a plan view of a portion 200 of a wafer where a magnetic read head is to be constructed, the entire wafer (not shown) being employed for constructing a plurality of read heads (not shown) arranged in rows and columns (not shown) on the wafer. The wafer portion 200 shows a sensor site 202, an air bearing surface (ABS) site 203, first and second via sites 204 and 206, and first and second lead layer sites 208 and 210 where leads will electrically connect side edges of the sensor to the via sites. Each via site 204 and 206 is for a vertically disposed (out of the paper) electrical conductor connecting a lead to a respective terminal (see 104 and 106 in FIG. 2). As shown in FIG. 10, a first shield layer 212, a first gap layer 214 and a sensor material layer (SV) 216 have been formed.

On top of the sensor material layer 216, a first oxidizable metallic layer 217 is formed for the purpose of protecting the sensor material layer in the area of the sensor site 202 during a subsequent oxidation step which is part of the present invention. The first oxidizable metallic layer may be tantalum (Ta), with a thickness of about 50 Å. In a prior art process, a first insulation layer (not shown) was formed on the sensor material layer 216 in an area behind the sensor site 202 toward the via sites 204. The purpose of this insulation layer was to prevent electrical shorts between the lead layers and the shield layers due to pinholes in the very thin first gap layer 214.

Figure 11:
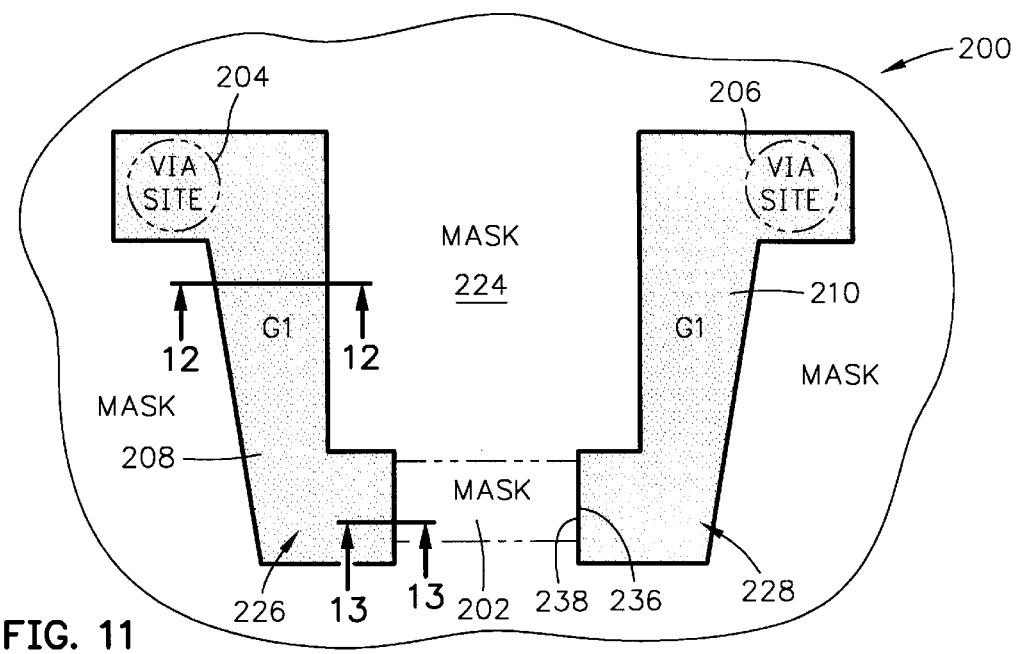
FIG. 11 is similar to FIG. 9 except a first mask has been formed with openings where the sensor material has been milled away.
Figure 12:
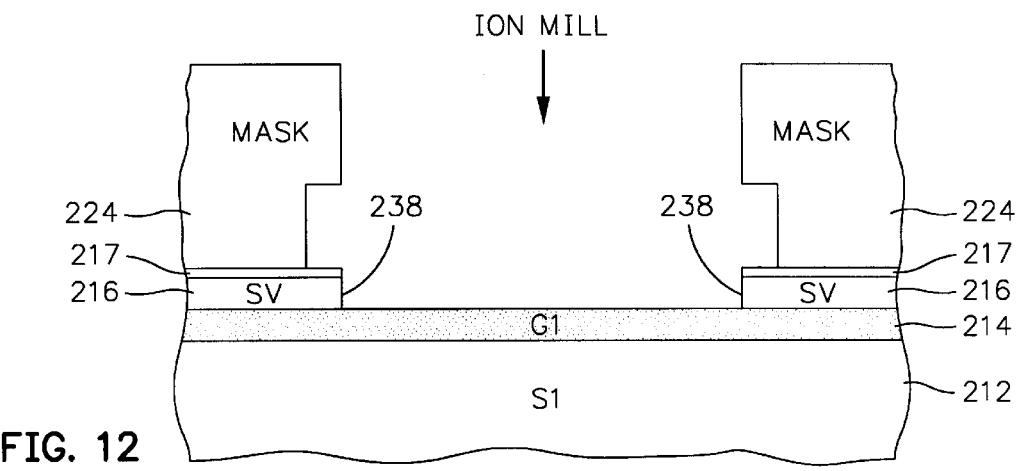
FIG. 12 is a view taken along plane 12—12 of FIG. 11.
Figure 13:
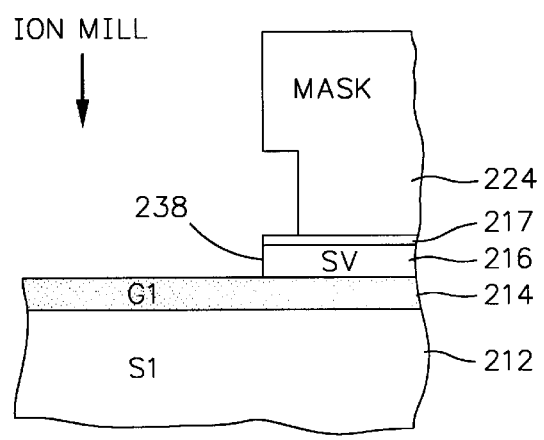
FIG. 13 is a view taken along plane 13—13 of FIG. 11.
Figure 14:
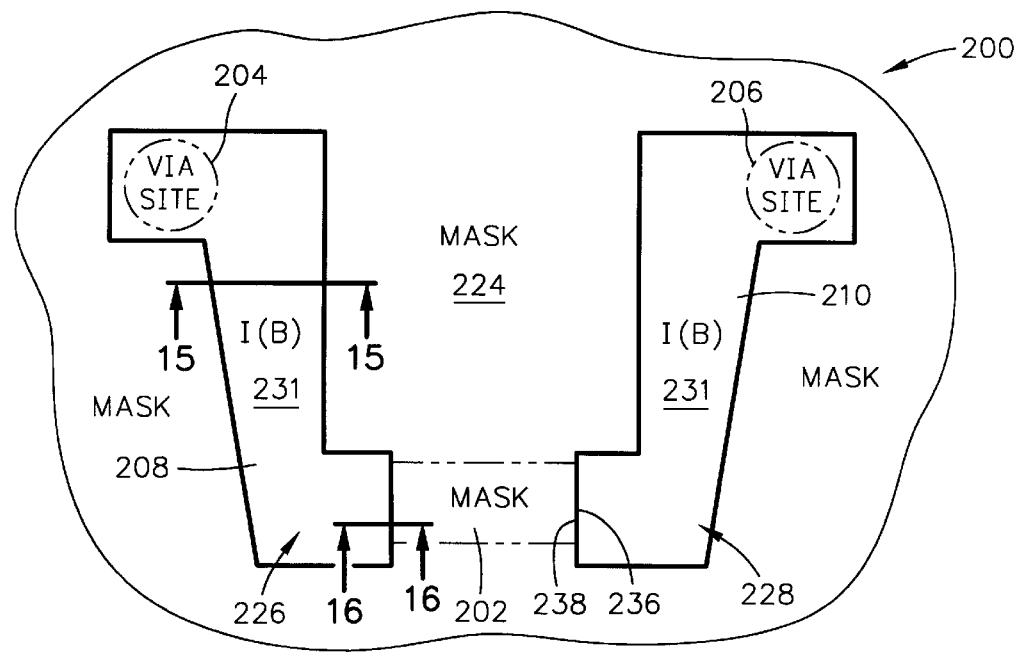
FIG. 14 is similar to FIG. 11 except a first lead layer film and a second oxidizable layer have been deposited within the openings of the mask.
Figure 15:
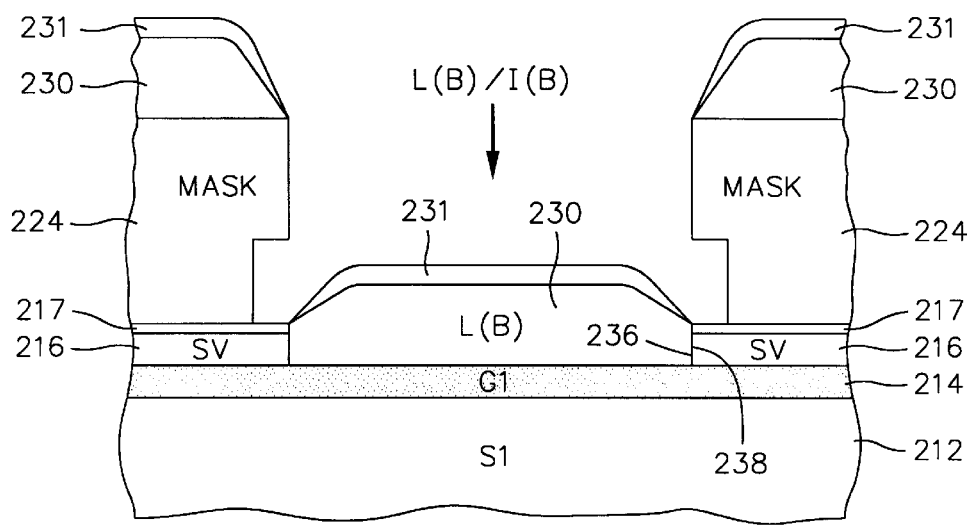
FIG. 15 is a view taken along plane 15—15 of FIG. 14.
Figure 16:
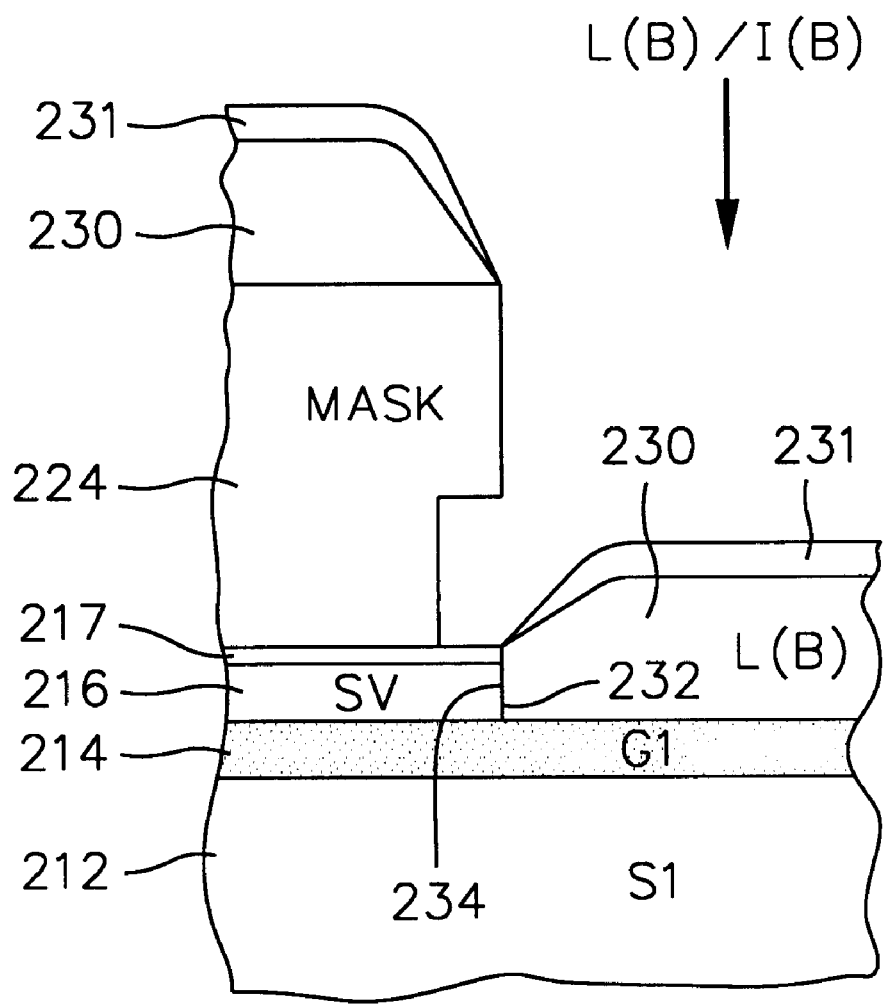
FIG. 16 is a view taken along plane 16—16 of FIG. 14.

In FIGS. 11, 12 and 13 a liftoff mask 224 is employed for covering the entire wafer portion 200, except for openings 226 and 228, within the first and second lead layer sites. As shown in FIGS. 12 and 13, the sensor material layer 216 and the first oxidizable layer 217 within the lead layer sites 226 and 228 is milled away. In FIGS. 14–16 hard bias and first lead layer films (shown as one film 230) are deposited on the first gap layer 214. A second oxidizable metallic layer 231 is then deposited on top of the first lead layer film 230 for the purpose of making an electrical insulation layer which will be described in detail hereinafter. The second oxidizable layer 231 may be zirconium (Zr) with a thickness of 500 Å. It should be noted that the hard bias and first lead layer film 230 and metallic layer 231 are full film depositions which deposit a portion of the film on top of the mask 224. As stated hereinabove, the mask 224 is a bilayer photoresist mask (shown as one layer) with the bottom layer (not shown) recessed from the top layer so that a solvent can dissolve the bottom. This allows the mask 224 to be removed (lift off) from the wafer along with the films thereon, which is done in a subsequent step.

Figure 17:
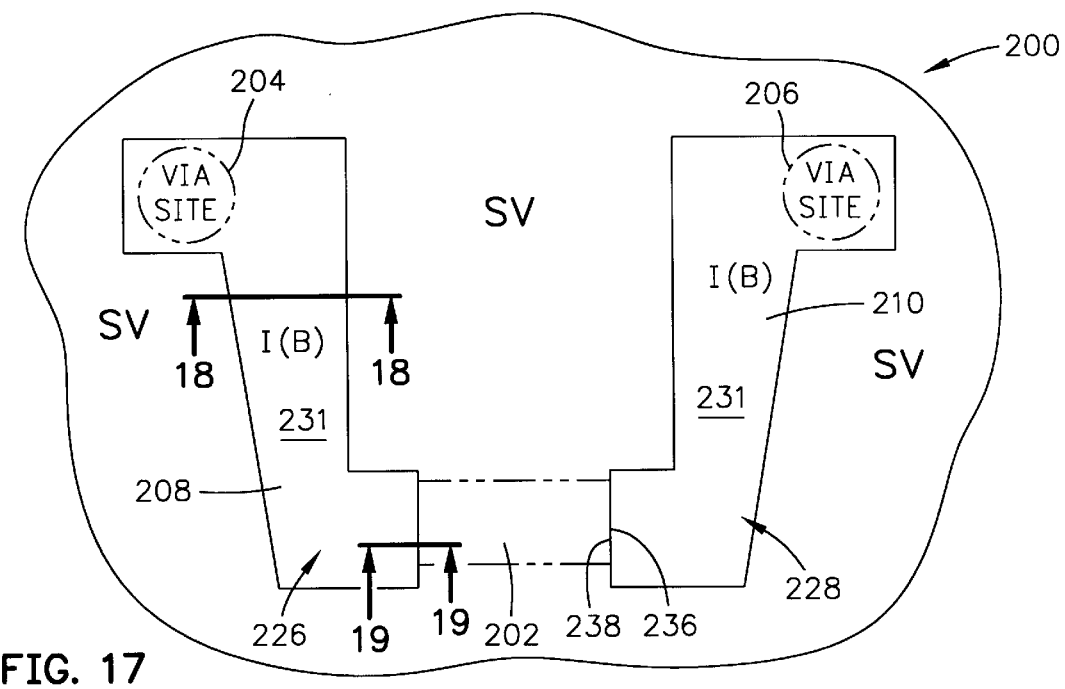
FIG. 17 is similar to FIG. 14 except the first mask has been removed.
Figure 18:
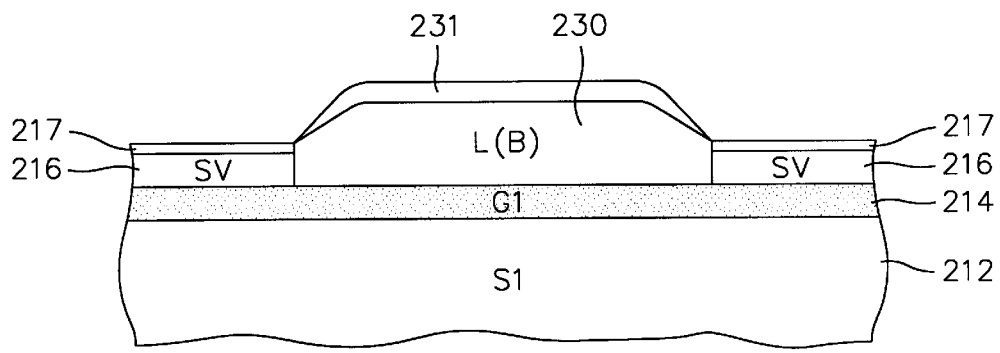
FIG. 18 is a view taken along plane 18—18 of FIG. 17.
Figure 19:
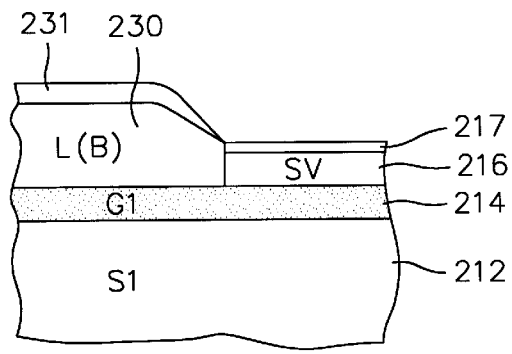
FIG. 19 is a view taken along plane 19—19 of FIG. 17.

It should be noted in FIGS. 14 and 16 that the sensor material 216 and the metallic layer 217 at the sensor site 202 have been formed with a side edge 232 (by the milling step in FIG. 12) which directly abut an end 234 of the layers 230 and 231 at the first lead layer site to form a contiguous junction therebetween. An opposite side edge 236 of the sensor also forms a contiguous junction with an end 238 of the hard bias and first lead layer film 230 and the second oxidizable metallic layer 231 at the second lead layer site 210. In FIGS. 17, 18 and 19 the mask 224 has been removed.

Figure 20:
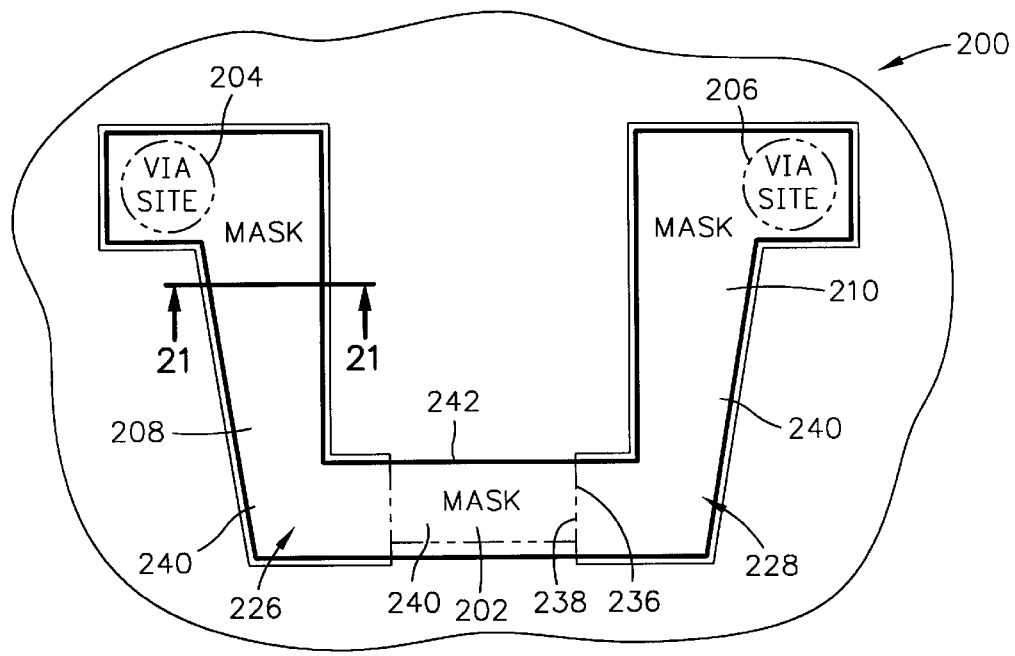
FIG. 20 is similar to FIG. 17 except a mask covers a sensor site and the second oxidizable layer.
Figure 21:
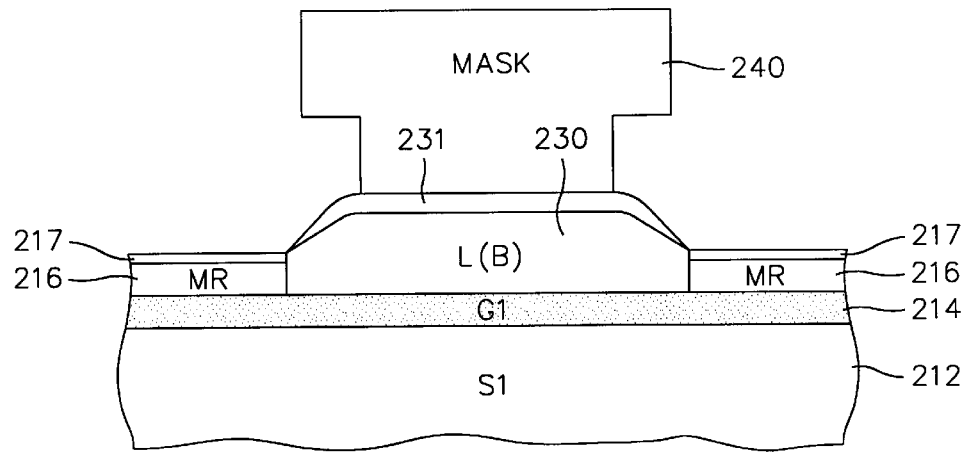
FIG. 21 is a view taken along plane 21—21 of FIG. 20.
Figure 22:
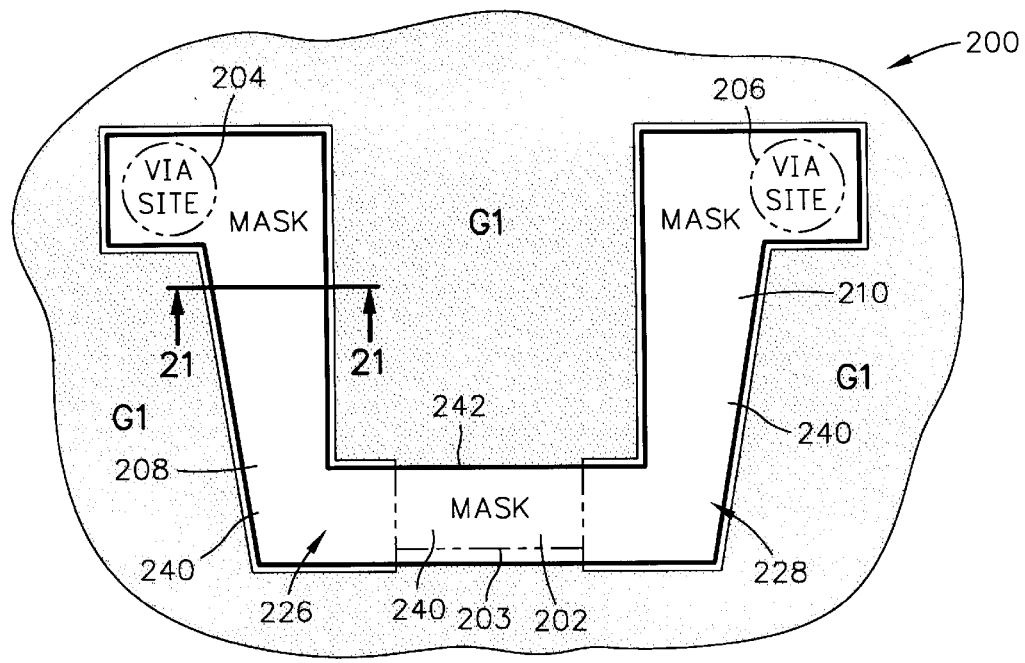
FIG. 22 is the same as FIG. 20 except ion milling has been implemented to remove the sensor material layer surrounding the mask.
Figure 23:
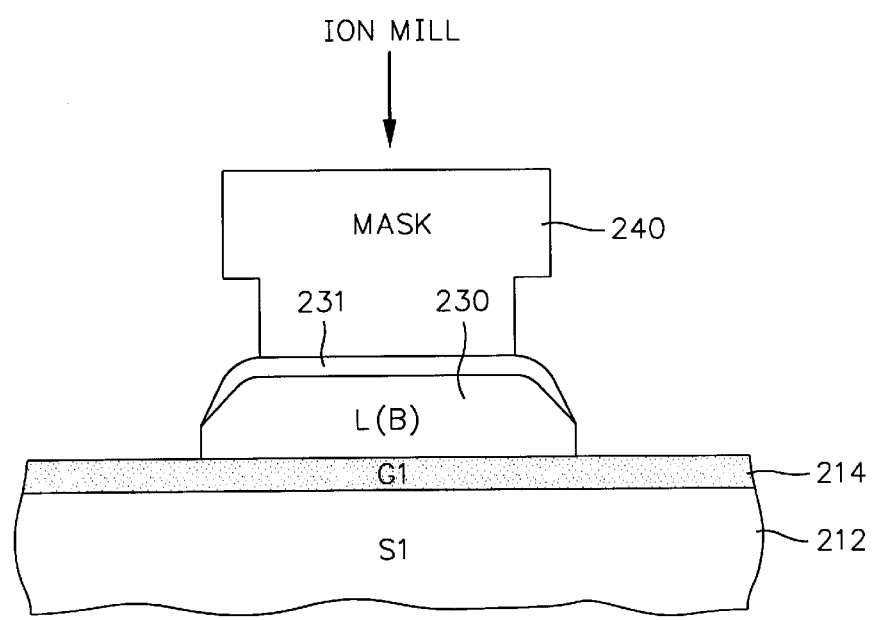
FIG. 23 is a view taken along plane 23—23 of FIG. 22.
Figure 24:
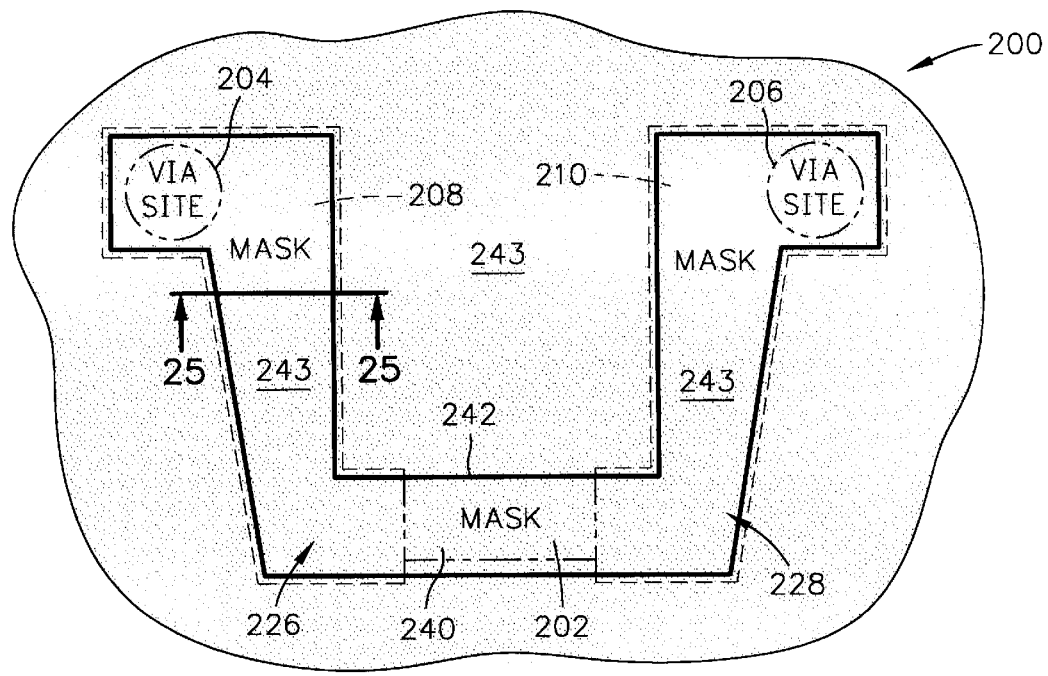
FIG. 24 is the same as FIG. 22 except an insulation layer has been deposited on the wafer everywhere except where the mask is located.
Figure 25:
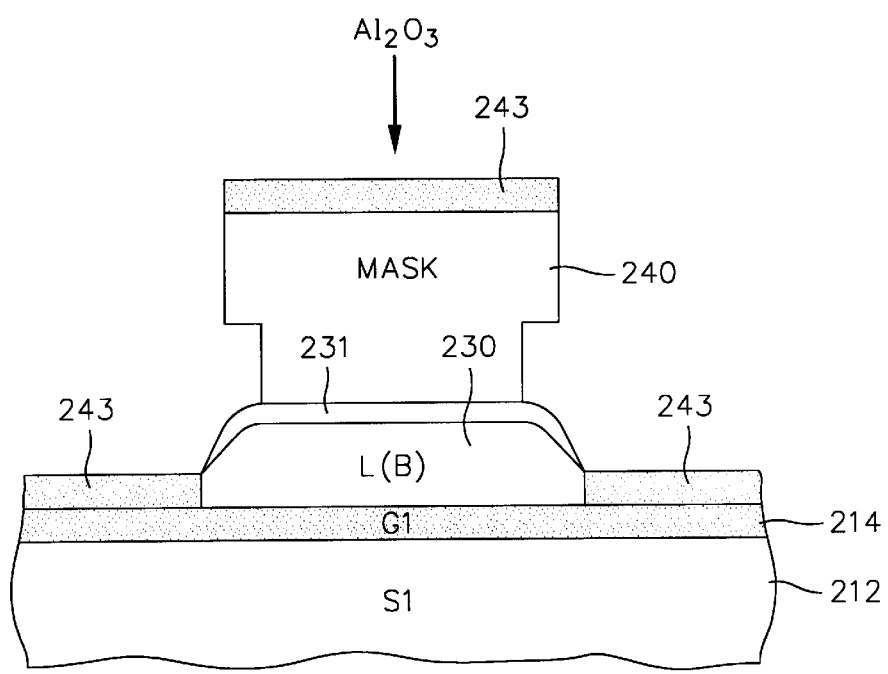
FIG. 25 is a view taken along plane 25—25 of FIG. 24.

In FIGS. 20 and 21 a second mask 240 has been formed covering only the sensor site 202 and the first and second lead layer sites 208 and 210. As shown in FIGS. 22 and 23, the remainder of the sensor material 216 and the first oxidizable metallic layer 217 are ion milled away so as to form a rear edge 242 which defines a height of the partially completed sensor. This exposes the first gap layer 214 everywhere except where the mask 240 is located. As shown in FIGS. 24 and 25, an insulation layer 243 such as aluminum oxide ($Al_2O_3$) is deposited, which completely covers the first gap layer 214 and also covers, to a lesser extent (not shown), the exposed side walls of the metallic layer 231. The insulation layer 243 abuts the rear edge 242 of the partially completed sensor for protecting this rear edge from oxidation during a subsequent process step of the present invention. The insulation 243 also provides extra insulation to protect the subsequently formed second lead layer films from electrical shorting to the first shield layer 212 even though the first gap layer 214 may have pinholes because of its extreme thinness.

Figure 26:
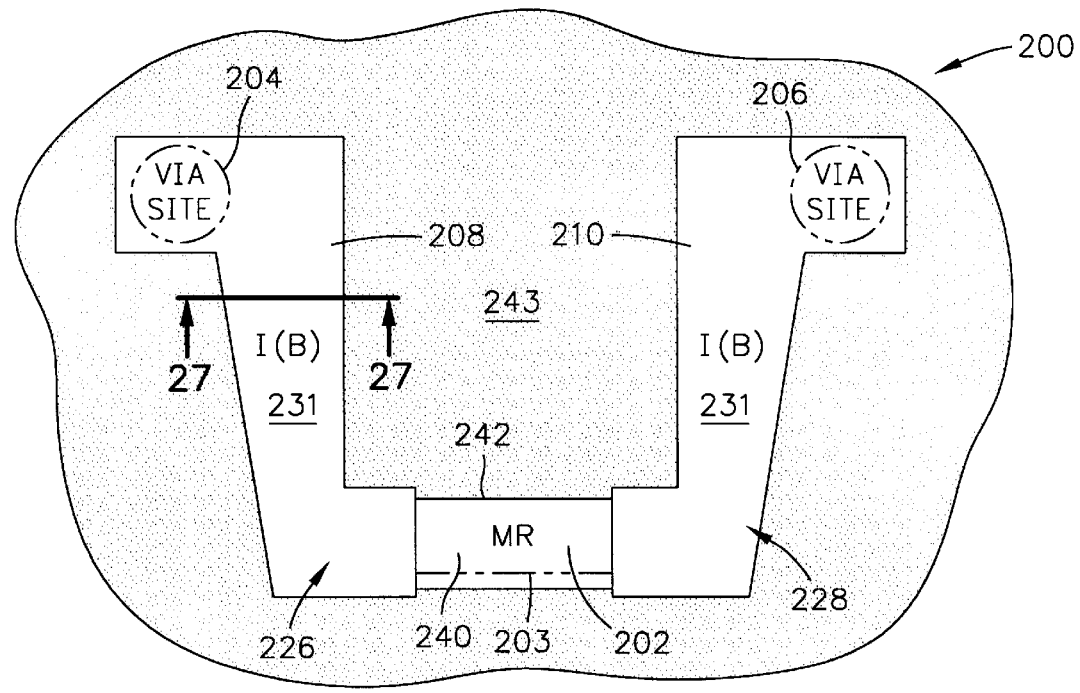
FIG. 26 is the same as FIG. 24 except the mask has been removed.
Figure 27:
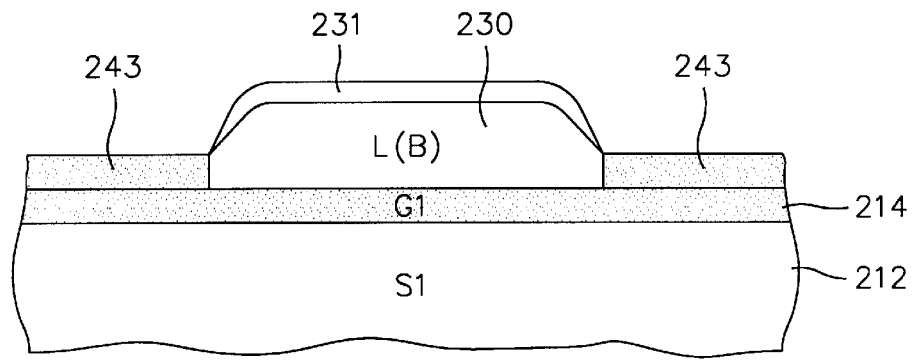
FIG. 27 is a view taken along plane 27—27 of FIG. 26.
Figure 28:
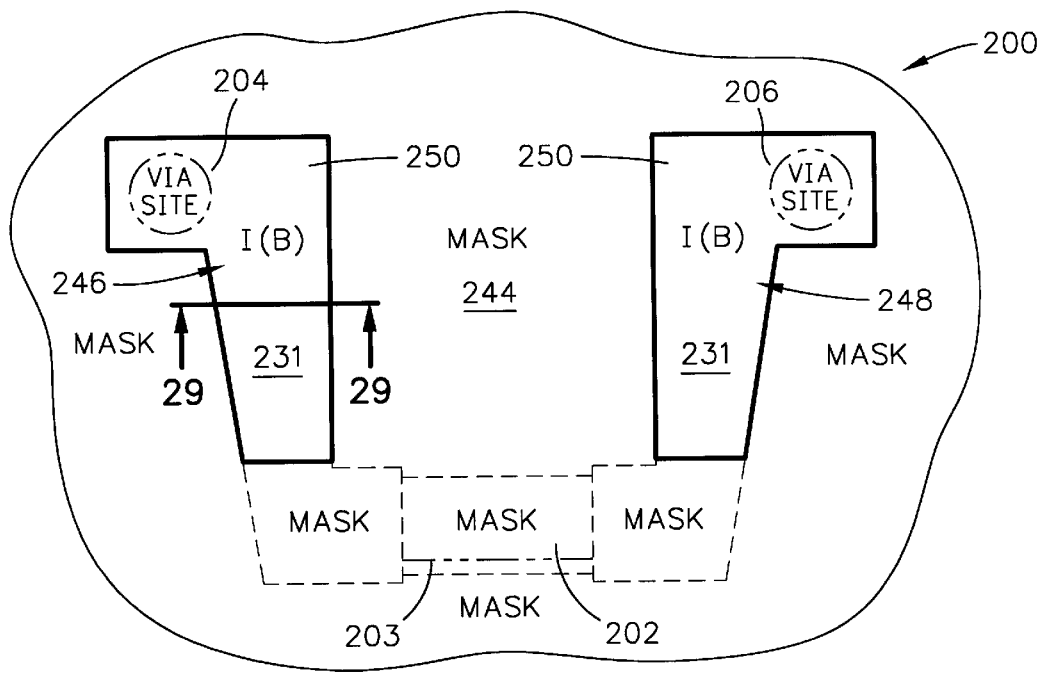
FIG. 28 is the same as FIG. 26 except a third mask has been formed with openings where a second lead layer film (extended lead layer portion) is to be deposited.
Figure 29:
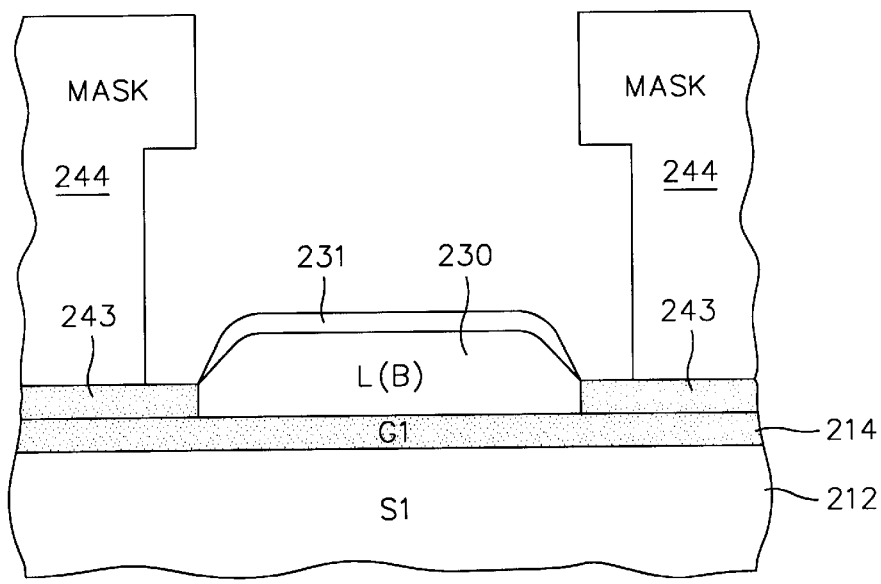
FIG. 29 is a view taken along plane 29—29 of FIG. 28.
Figure 30:
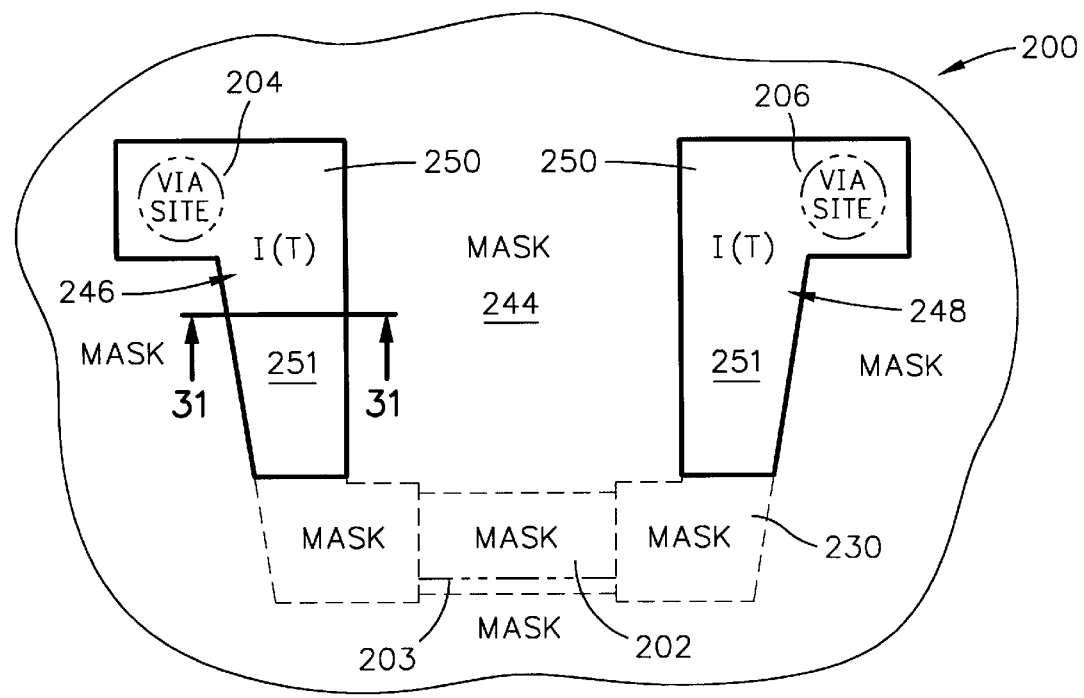
FIG. 30 is the same as FIG. 28 except a second lead layer film and the second oxidizable layer have been deposited within the openings of the mask.
Figure 31:
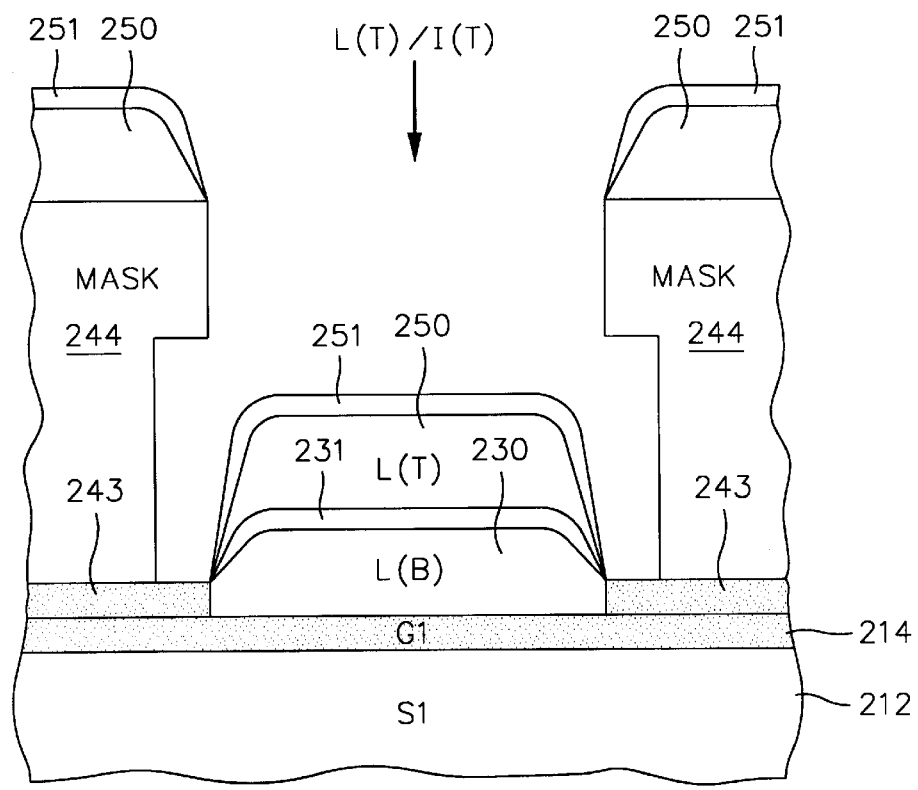
FIG. 31 is a view taken along plane 31—31 of FIG. 30.
Figure 32:
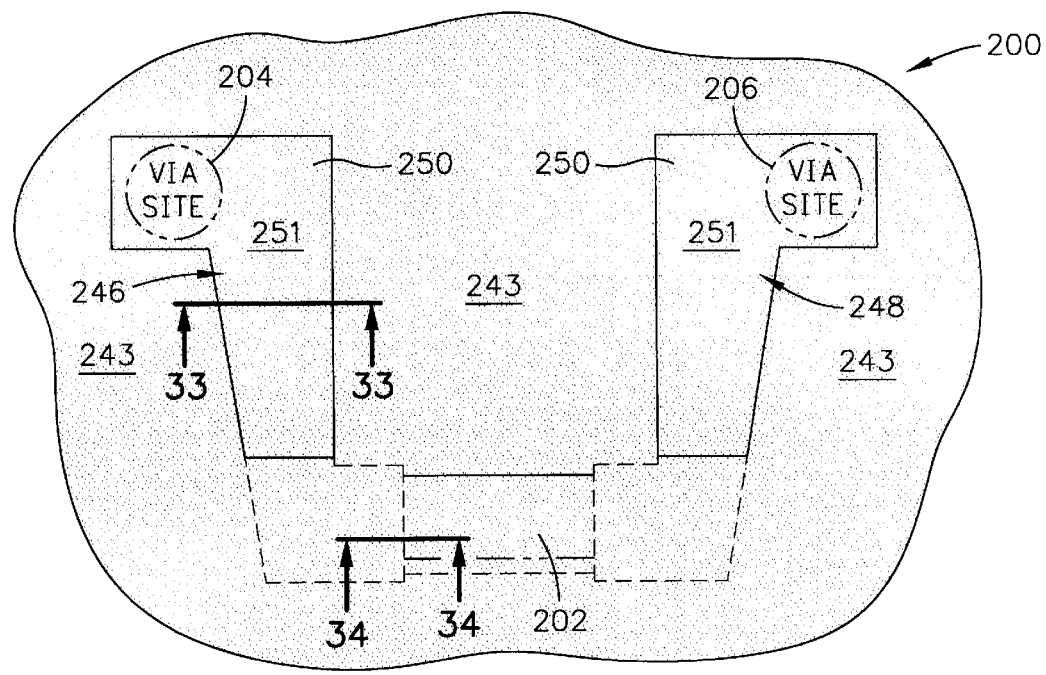
FIG. 32 is the same as FIG. 30 except the mask has been removed and the wafer portion is subjected to an oxygen-based plasma causing the first and second oxidizable layers to be oxidized.
Figure 33:
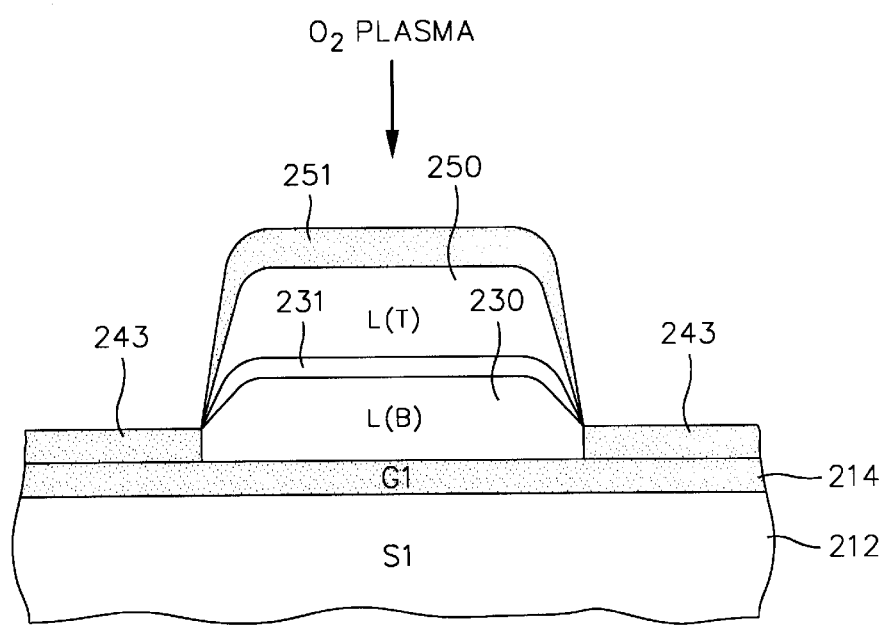
FIG. 33 is a view taken along plane 33—33 of FIG. 32.
Figure 34:
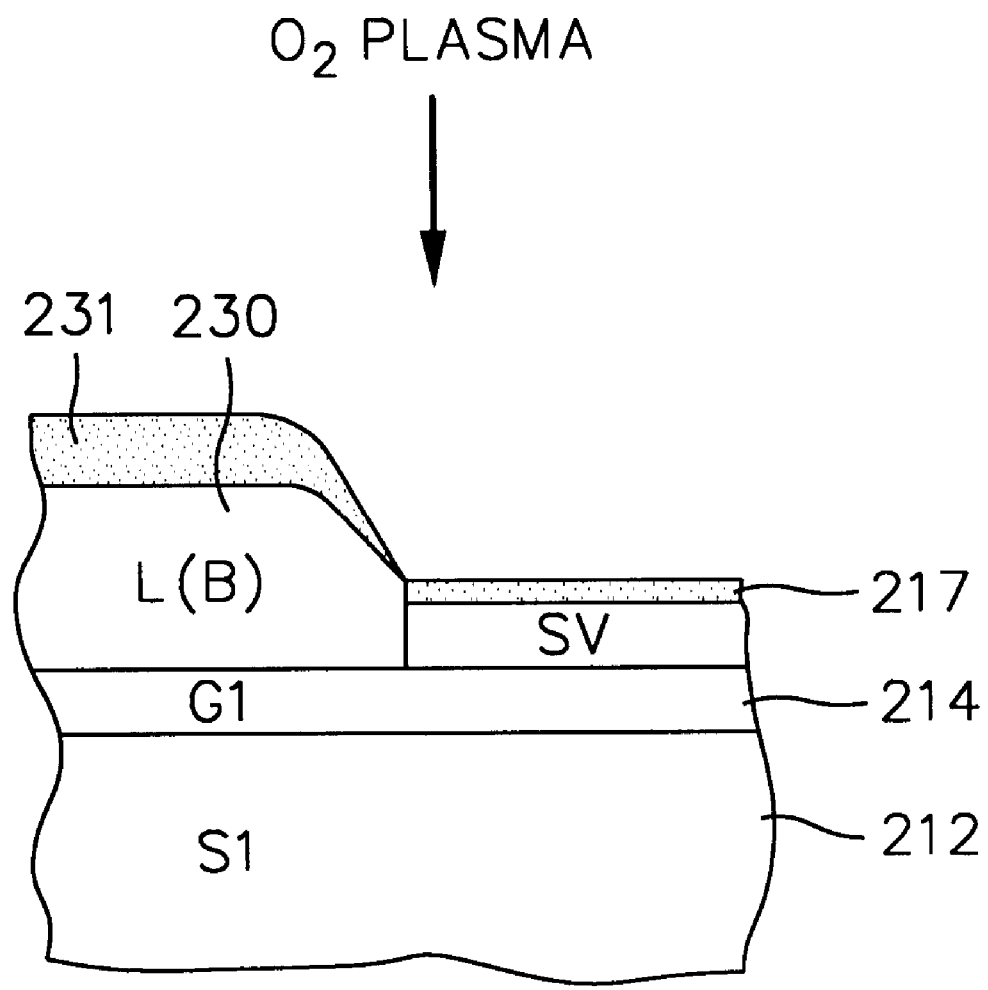
FIG. 34 is a view taken along plane 34—34 of FIG. 32.

In FIGS. 26 and 27 the second mask 240 of FIG. 24 has been removed and, as shown in FIGS. 28 and 29, a third mask 244 has been formed over the entire wafer portion 200, except for rear openings 246 and 248 within the first and second lead layer sites. As shown in FIGS. 30 and 31, a second lead layer film 250 is deposited in the openings 246 and 248 so as to overlap and make connection with the first lead layer films 230. Next, a third oxidizable metallic layer 251 is deposited on the second lead layer film 250 which may be the same material and thickness as the oxidizable metallic layer 231. In FIGS. 32–34 the mask 244 has been removed. At this stage in a prior art process a fourth mask (not shown) is employed for forming a second insulation layer (not shown) behind the sensor site 202 for insulating primarily the second lead layer film 250 from a subsequently formed second shield layer. This step is obviated by the present method.

Next, the wafer portion 200 is subjected to an oxygen-based plasma, as shown in FIGS. 32–34. This oxidizes the first oxidizable metallic layer 217 (FIG. 34) and each of the second and third oxidizable metallic layers 231 (FIG. 34) and 251 (FIG. 33). It is important that the second and third oxidizable metallic layers 231 and 251 be oxidized at a faster rate than the first oxidizable metallic layer 217. If the first oxidizable layer 217 is oxidized throughout its thickness, this will then cause oxidation of the partially completed sensor which will alter the designed magnetics of the read head. Accordingly, the material and thickness of the first oxidizable layer 217 is carefully chosen with respect to the material and thickness of the second and third oxidizable metallic layers 231 and 251. After oxidation of the metallic layers 217, 231 and 251, the material of these layers expands laterally as well as in height. The oxidized metal provides an insulation preventing electrical shorting between the lead layer films and the second shield layers.

In a specific example, the first oxidizable metallic layer 217 was tantalum (Ta) 50 Å thick and each of the second and third oxidizable metallic layers were zirconium (Zr) 500 Å thick. The oxidizable metallic layers were subjected to an oxygen-based plasma in an inductively coupled high density plasma chamber for 5 minutes at a source power of 400 W, bias power of 100 W and a pressure of 5 millitorr. After the oxidization 30 Å of oxidized Ta was about 60 Å thick and the 400 Å of oxidized Zr was about 800 Å thick. Ta and Zr are the preferred materials for capping the sensor and lead layers respectively. In this preferred embodiment, after oxidization, the oxidized portion of the second and third oxidizable layers 231 and 251 is greater than ten times the oxidized portion of the first oxidizable layer 217. Other suitable materials are hafnium (Hf), niobium (Nb), titanium (Ti) and yttrium (Y) provided the capping layer for the lead layers oxidizes at a faster rate than the capping layer for the sensor.

Figure 35:
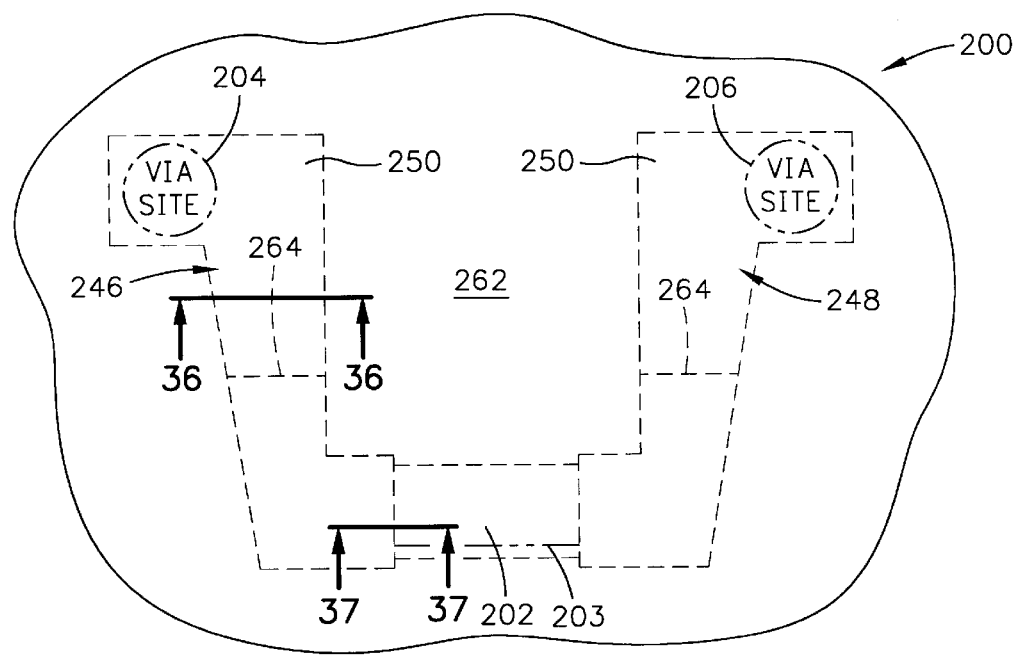
FIG. 35 is the same as FIG. 32 except a second gap layer and a second shield layer have been formed.
Figure 36:
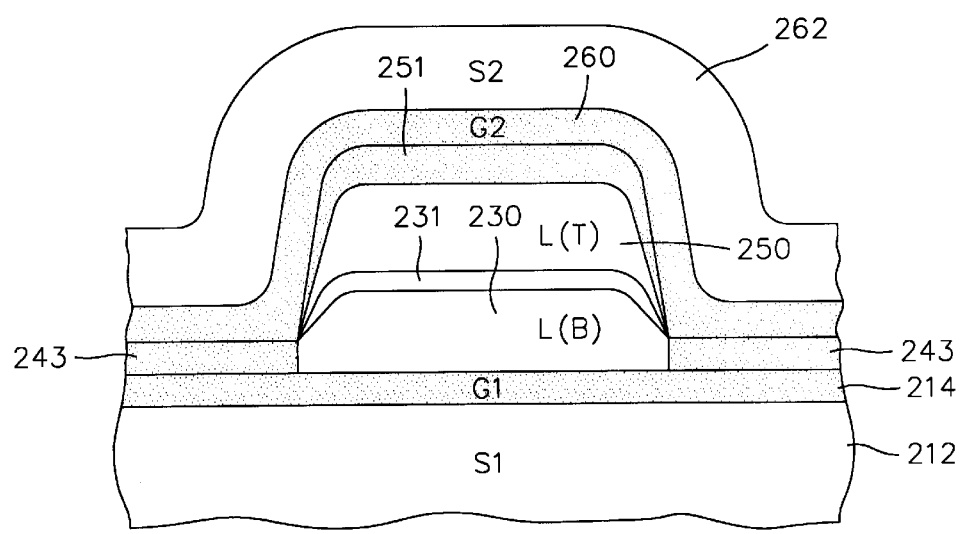
FIG. 36 is a view taken along plane 36—36 of FIG. 35.
Figure 37:
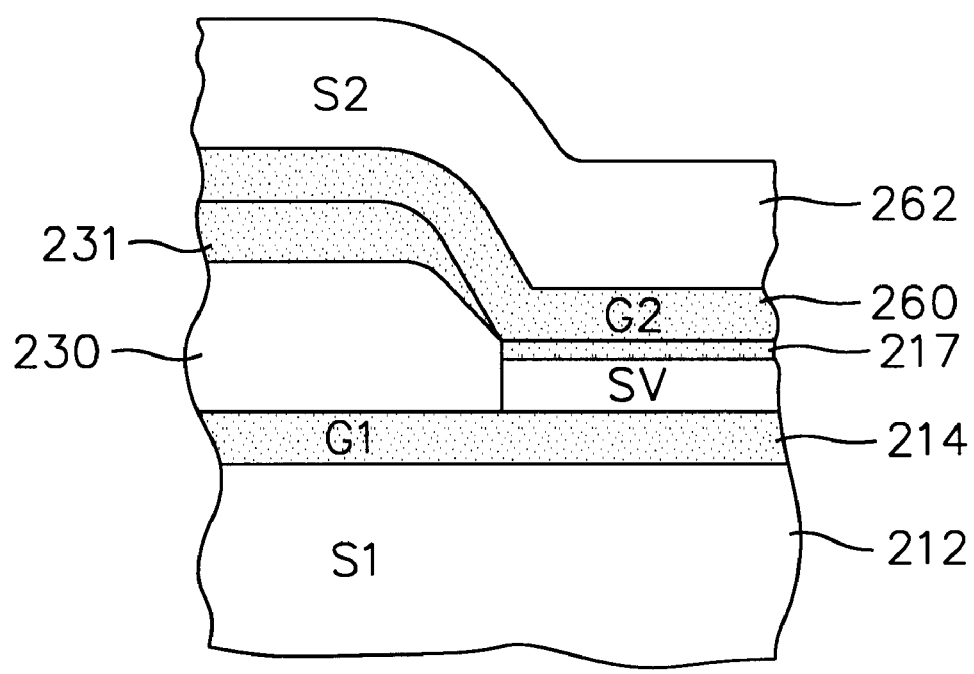
FIG. 37 is a view taken along plane 37—37 of FIG. 35.

In FIGS. 35–37, a full film second insulative gap layer 260 is formed over the entire wafer portion and a full film second shield layer 262 is formed on the second gap layer 260. The shapes of the second shield layer 262 and the first shield layer 212 can be formed at this time or, alternatively, the first shield layer 212 may be shaped at the time of its deposition and the second shield layer 262 can be shaped at the time of its deposition. These steps, which are well-known, are not shown in the drawings.

It can be seen from FIG. 36 that the second lead layer film 250 is protected from electrical shorting to the second shield layer 262 by the oxidized third oxidizable metallic film 251 and the second gap layer 260. This obviates the need for a second insulation layer to be formed with a masking step prior to the deposition of the second gap layer 260, as taught by prior art process. Further, it eliminates the prior art second insulation layer laterally between the second lead layer films 250 of the first and second lead layers, thereby allowing greater heat dissipation from the sensor during its operation in a magnetic disk drive.

As shown in FIG. 37, the first lead layer film 230 is protected from shorting to the second shield layer 262 by the oxidized second oxidizable metallic layer 231 and the second gap layer 260. The oxidized layer 231 provides discrete extra insulation which was not available in prior art read heads. It should be noted that the bottom of the second lead layer film 230 is only protected by the first gap layer 214 from shorting to the first shield layer 212. This is the same risk as that encountered in the prior art process and extends from the side edge of the partially completed sensor to an opposite end edge shown in FIG. 36. Accordingly, the present process is an improvement over the prior art process in that extra insulation 251 is provided between the top surfaces of the first and second lead layers 230 and 250 and the second shield layer 262.

It should be understood that the first lead layer film 230 may optionally extend only part way from the side edge of the sensor to the respective via site. Further, the second lead layer film 250 may overlap the first lead layer film 230 and extend partially to the via site with a subsequent third lead layer film (not shown) overlapping the second lead layer film and extending to the respective via site. The materials of the first insulative gap layer 214, the insulation layer 243 and the second insulative gap layer 260 may be aluminum oxide. While the description has described the components primarily for the first lead layer site 208, it should be understood that this description applies equally well to the second lead layer site 210.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a thin film magnetic read head with short protection insulation material between lead layers and a second shield layer comprising:

forming a ferromagnetic first shield layer;

forming a nonmagnetic, electrically insulative first gap layer on the first shield layer;

forming a ferromagnetic sensor layer on the first gap layer;

forming a first oxidizable metallic layer on the sensor layer;

forming the sensor layer and said first oxidizable metallic layer thereon with first and second side edges;

forming first and second electrically conductive lead layers with each lead layer having a first end edge abutting a respective side edge to form a contiguous junction therewith;

forming a second oxidizable metallic layer on each of the first and second lead layers;

the first and second oxidizable metallic layers being of different materials so that the second oxidizable metallic layer oxidizes at a faster rate than the first oxidizable metallic layer;

oxidizing the oxidizable metallic layers;

terminating said oxidizing of the oxidizable metallic layers before the first oxidizable metallic layer is oxidized throughout its thickness;

after oxidizing the oxidizable metallic layers, forming a nonmagnetic, electrically insulative second gap layer on the oxidizable metallic layers; and forming a ferromagnetic second shield layer on the second gap layer, whereby, after oxidation, the second oxidizable metallic layer and the second gap layer provide insulation between each of the first and second lead layers and the second shield layer.

2. A method as claimed in claim 1 including:

before oxidizing, forming the sensor layer with a top edge; and forming a nonmagnetic insulation layer abutting the top edge of the sensor layer for protecting the top edge from said oxidation.

3. A method as claimed in claim 1 wherein said oxidizing comprises $O_2$ plasma oxidizing.

4. A method as claimed in claim 1 wherein the first and second oxidizable metallic layers are selected from the group consisting of Ta Zr, Hf, Y, Nb and Ti.

5. A method as claimed in claim 1 wherein, after oxidization, the maximum thickness of the oxidized portion of the second oxidizable metallic layer is greater than 10 times the maximum thickness of the oxidized portion of the first oxidizable metallic layer.

6. A method as claimed in claim 1 wherein the second oxidizable metallic layer has a thickness of about 500 Å.

7. A method as claimed in claim 1 wherein the second oxidizable metallic layer is Zr.

8. A method as claimed in claim 7 wherein the first oxidizable metallic layer is Ta.

9. A method as claimed in claim 1 wherein the sensor is a spin valve sensor.

10. A method as claimed in claim 1 wherein the sensor is an anisotropic magnetoresistive (AMR) sensor.

11. A method as claimed in claim 1 including:

after forming the first and second lead layers, but before said oxidizing, forming the sensor layer with a top edge; and forming a nonmagnetic insulation layer on the first gap layer interfacing the top edge of the sensor layer.

12. A method as claimed in claim 11 wherein said oxidizing comprises $O_2$ plasma oxidizing.

13. A method as claimed in claim 12 wherein the oxidizable metallic layers are selected from the group consisting of Ta, Zr, Hf, Y, Nb and Ti.

14. A method as claimed in claim 13 wherein, after oxidization, the maximum thickness of the oxidized portion of the second oxidizable metallic layer is greater than 10 times the maximum thickness of the oxidized portion of the first oxidizable metallic layer.

15. A method as claimed in claim 14 wherein the second oxidizable metallic layer has a thickness of about 500 Å.

16. A method as claimed in claim 15 wherein the second oxidizable metallic layer is Zr.

17. A method as claimed in claim 16 wherein the first oxidizable metallic layer is Ta.

18. A method as claimed in claim 17 wherein the sensor is a spin valve sensor.

19. A method as claimed in claim 17 wherein the sensor is an anisotropic magnetoresistive (AMR) sensor.

20. A method of making a read head with extra short protection insulation material between lead layers and the first and second shield layers, comprising:

forming a ferromagnetic first shield layer;

forming a nonmagnetic, electrically insulative first gap layer on the first shield layer;

forming a full film sensor layer on the first gap layer;

forming a full film of a first oxidizable metallic material layer on the sensor layers;

the sensor layer and the first oxidizable metallic layer thereon having a sensor site with first and second side edge sites and a top edge site, and having first and second lead layer sites, wherein each lead layer site has an end edge site that is located al a respective side edge site of the sensor site;

forming a first liftoff mask on the first oxidizable metallic layer with first and second openings that expose first and second portions of the first oxidizable metallic layer at first and second lead layer sites;

ion milling through said first and second openings to remove said first and second portions of the first oxidizable metallic layer and first and second portions of said sensor layer thereunder down to first and second portions of the first gap layer at the first and second lead layer sites, thereby forming the first oxidizable metallic layer and the sensor layer thereunder with first and second side edges at said first and second side edge sites respectively;

depositing a first film of a lead layer material;

depositing a second oxidizable metallic material layer on the first film of the lead layer material;

removing the first liftoff mask with materials thereon, leaving a first film of first and second lead layers with second oxidizable material layer portions thereon which have first and second edges that abut first and second side edges of the sensor material layer and the first oxidizable material layer thereon;

forming a second liftoff mask on the second oxidizable material layer on the first film of the first and second lead layers and on the first oxidizable metallic layer portion located at said sensor site with a top edge that is located at said top edge site;

ion milling an exposed portion of the first oxidizable metallic layer and exposed portions of the sensor material layer down to the first gap layer, leaving each of the first oxidizable material layer and the sensor material layer thereunder with a top edge at said top edge site;

depositing a full film nonmagnetic electrical insulation layer that abuts the top edge of each of the first oxidizable material layer and the sensor material layer thereunder;

removing the second liftoff mask with nonmagnetic insulation layer material thereon;

forming a third liftoff mask with first and second openings that partially expose the first film of the first and second lead layers with portions of the second oxidizable metallic layer thereon;

depositing a second film of second lead layer material to form a second film of first and second lead layers that overlaps said portions of the second oxidizable metallic layer and the first film of the first and second lead layers thereunder;

depositing a third oxidizable metallic material layer;

removing the third liftoff mask with materials thereon, leaving portions of the third oxidizable metallic layer on the second film of the first and second lead layers;

the first oxidizable metallic layer being of different material than the second and third oxidizable metallic layers so that the second and third oxidizable metallic layers oxidize at a faster rate than the first oxidizable metallic layer;

oxidizing the oxidizable metallic layers;

terminating said oxidizing of the oxidizable metallic layers before the first oxidizable metallic layer is oxidized throughout its thickness;

after oxidizing the oxidizable metallic layers, forming a nonmagnetic, electrically insulative second gap layer on the first oxidizable metallic layer and the second and third oxidizable metallic layers; and forming a ferromagnetic second shield layer on the second gap layer, whereby the second oxidizable metallic layer provides short protection between the first film of the first and second lead layers and the second shield layer and the second oxidizable metallic layer provides short protection between the second film of the first and second lead layers and the second shield layer.

21. A method as claimed in claim 20 wherein said oxidizing comprises $O_2$ plasma oxidizing.

22. A method as claimed in claim 21 wherein the oxidizable metallic layers are selected from the group consisting of Ta, Zr, Hf, Y, Nb and Ti.

23. A method as claimed in claim 22 wherein the maximum thickness of each of the second and third oxidizable metallic layers is approximately 10 times the thickness of the first oxidizable metallic layer.

24. A method as claimed in claim 23 wherein each of the second and third oxidizable metallic layers has a thickness of about 500 Å.

25. A method as claimed in claim 24 wherein the second and third oxidizable metallic layers are Zr.

26. A method as claimed in claim 25 wherein the first oxidizable metallic layer is Ta.

27. A method of making components of a magnetic head that has a read head portion and a write head portion wherein the read head portion includes insulation between lead layers and at least one of the shield layers, comprising:

making components of the read head portion by:
    forming a ferromagnetic first shield layer;
    forming a nonmagnetic, electrically insulative first gap layer on the first shield layer;
    forming a sensor layer on the first gap layer;
    forming a first oxidizable metallic layer on the sensor layer;
    forming the sensor layer and the first oxidizable metallic layer with first and second side edges;
    forming first and second electrically conductive lead layers with each lead layer having a first end edge abutting a respective side edge of the sensor layer to form a contiguous junction therewith;
    forming a second oxidizable metallic layer on each of the first and second lead layers;
    the first and second oxidizable metallic layers being of different materials so that the second oxidizable metallic layer oxidizes at a faster rate than the first oxidizable metallic layer;
    oxidizing the oxidizable metallic layers;
    terminating said oxidizing of the oxidizable metallic layers before the first oxidizable metallic layer is oxidized throughout its thickness so that the sensor layer is protected from oxidization;
    after oxidizing the oxidizable metallic layers forming a nonmagnetic, electrically insulative second gap layer on the first and second oxidizable metallic layers; and
    forming a ferromagnetic second shield layer on the second gap layer making the write portion of the magnetic head including the steps of:
    forming a third insulative gap layer and a first insulation layer on the second shield layer;
    forming a coil layer on the third insulation gap layer and the first insulation layer;
    forming one or more additional insulation layers on the coil layer; and
    forming a pole piece layer on the third gap layer and said additional insulation layers.

28. A method as claimed in claim 27 including:
after forming the first and second lead layers, but before said oxidizing, forming the sensor layer with a top edge; and
    forming a nonmagnetic insulation layer on the first gap layer, adjacent the top edge of the sensor layer.

29. A method as claimed in claim 28 wherein said oxidizing comprises $O_2$ plasma oxidizing.

30. A method as claimed in claim 29 wherein the first and second oxidizable metallic layers are selected from the group consisting of Ta, Zr, Hf, Y, Nb and Ti.

31. A method as claimed in claim 30 wherein the maximum thickness of the second oxidizable metallic layer is approximately 10 times the thickness of the first oxidizable metallic layer.

32. A method as claimed in claim 31 wherein the second oxidizable metallic layer has a thickness of about 500 Å.

33. A method as claimed in claim 32 wherein the second oxidizable metallic layer is Zr.

34. A method as claimed in claim 33 wherein the first oxidizable metallic layer is Ta.

* * * * *